US012761694B2

(12) United States Patent
Du et al.

(10) Patent No.: US 12,761,694 B2
(45) Date of Patent: Oct. 13, 2026

(54) ELECTRONIC DEVICE AND METHOD FOR CONTROLLING ELECTRONIC DEVICE

(71) Applicant: VIVO MOBILE COMMUNICATION CO., LTD., Guangdong (CN)

(72) Inventors: Xianhe Du, Guangdong (CN); Mingjian Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 509 days.

(21) Appl. No.: 17/738,638

(22) Filed: May 6, 2022

(65) Prior Publication Data

US 2022/0261043 A1 Aug. 18, 2022

Related U.S. Application Data

(63) Continuation of application No. PCT/CN2020/127049, filed on Nov. 6, 2020.

(30) Foreign Application Priority Data

Nov. 7, 2019 (CN) ......................... 201911084243.7

(51) Int. Cl.
*G06F 1/16* (2006.01)
*G05B 15/02* (2006.01)
*G09G 3/00* (2006.01)

(52) U.S. Cl.
CPC ........... *G06F 1/1652* (2013.01); *G05B 15/02* (2013.01); *G09G 3/035* (2020.08); *G09G 2320/028* (2013.01)

(58) Field of Classification Search
CPC .................. G06F 1/1652; G09G 3/035; G09G 2320/028; G05B 15/02
See application file for complete search history.

(56) References Cited

U.S. PATENT DOCUMENTS

2013/0265262 A1 10/2013 Jung et al.
2013/0329422 A1 12/2013 Park et al.
(Continued)

FOREIGN PATENT DOCUMENTS

CN 104517557 A 4/2015
CN 104714699 A 6/2015
(Continued)

OTHER PUBLICATIONS

English Translation of CN 106527728 (Year: 2017).*
(Continued)

*Primary Examiner* — Patrick N Edouard
*Assistant Examiner* — Eboni N Giles
(74) *Attorney, Agent, or Firm* — BROOKS KUSHMAN P.C.

(57) ABSTRACT

An electronic device and a method for controlling an electronic device are disclosed. The electronic device includes: a screen, where the screen includes a bendable flexible screen portion; a flexible threaded rod, where the flexible threaded rod is disposed on a back side of the flexible screen portion; and at least two support blocks, where each of the support blocks is arranged on the back side of the flexible screen portion and is configured to support the flexible screen portion, each support block is sleeved on the flexible threaded rod, each support block matches the flexible threaded rod through threads, and the flexible threaded rod and the at least two support blocks are movable between a first state and a second state; where in the first state, the flexible screen portion is curved; and in the second state, the flexible screen portion is flat.

12 Claims, 5 Drawing Sheets

(56) References Cited

U.S. PATENT DOCUMENTS

| | | | | |
|---|---|---|---|---|
| 2015/0092361 | A1 | 4/2015 | Cho et al. | |
| 2015/0223358 | A1 | 8/2015 | Nam et al. | |
| 2017/0285688 | A1 | 10/2017 | Sun | |
| 2017/0344072 | A1* | 11/2017 | Sun | G02F 1/133305 |
| 2018/0232189 | A1* | 8/2018 | Yang | H05K 5/03 |
| 2020/0296843 | A1 | 9/2020 | Gao et al. | |
| 2021/0405691 | A1* | 12/2021 | Xu | G06F 1/1652 |
| 2023/0185338 | A1* | 6/2023 | Seo | G06F 1/1652 361/679.28 |

FOREIGN PATENT DOCUMENTS

| | | | | |
|---|---|---|---|---|
| CN | 105225614 | A | 1/2016 | |
| CN | 106297568 | * | 1/2017 | G09F 9/301 |
| CN | 106527728 | A | 3/2017 | |
| CN | 107680488 | A | 2/2018 | |
| CN | 109904204 | A | 6/2019 | |
| CN | 110062069 | A | 7/2019 | |
| CN | 110083298 | A | 8/2019 | |
| CN | 110879671 | A | 3/2020 | |
| EP | 2717119 | A1 | 4/2014 | |
| KR | 20130138614 | A | 12/2013 | |

OTHER PUBLICATIONS

First Office Action for Korean Application No. 10-2022-7017206, dated Mar. 21, 2024, 10 Pages.

First Office Action for Chinese Application No. 201911084243.7, dated Feb. 1, 2021, 12 Pages.

International Search Report and Written Opinion for Application No. PCT/CN2020/127049, dated Jan. 29, 2021, 10 Pages.

"Forms and Application of Sliding Screw Transmission," Automatic Control Network, Oct. 31, 2015, url: http://www.eadianqi.com/zc/jidian/3324.html, 1 Page.

1st Chinese Office Action, English Translation.

International Search Report and Written Opinion, English Translation.

CN104517557A, English Abstract and U.S. Equivalent U.S. Pub. No. 2015/0092361.

CN104714699A, English Abstract and U.S. Equivalent U.S. Pub. No. 2017/0285688.

CN105225614A, English Abstract and U.S. Equivalent U.S. Pub. No. 2017/0344072.

CN106527728A, English Abstract and Machine Translation.

CN107680488A, English Abstract and Machine Translation.

CN109904204A, English Abstract and U.S. Equivalent U.S. Pub. No. 2020/0296843.

CN110062069A, English Abstract and Machine Translation.

CN110083298A, English Abstract and U.S. Equivalent U.S. Pub. No. 2013/0265262.

CN110879671A, English Abstract and Machine Translation.

Non-patent literature reference entitled, "Forms and Application of Sliding Screw Transmission", English Translation of relevant portions.

* cited by examiner

ELECTRONIC DEVICE AND METHOD FOR CONTROLLING ELECTRONIC DEVICE

CROSS-REFERENCE TO RELATED APPLICATIONS

This application is a continuation of International Application No. PCT/CN2020/127049 filed on Nov. 6, 2020, which claims priority to Chinese Patent Application No. 201911084243.7, filed on Nov. 7, 2019, which are incorporated herein by reference in their entireties.

TECHNICAL FIELD

The present invention relates to the field of electronic technologies, and in particular, to an electronic device and a method for controlling an electronic device.

BACKGROUND

With continuous improvement on the design of electronic devices with screens, such as smartphones and tablet computers, people's aesthetics for these electronic devices are also changing. To adapt to people's aesthetic demands, existing screens of electronic devices have more new designs, such as curved screens and waterfall screens, so as to improve display effects of the screens.

Although curved screens including waterfall screens and the like can provide users with a good visual display effect and a good grip feeling, when a user uses an electronic device with a curved screen such as a waterfall screen, due to curvature of the screen and propagation of light along straight lines, pictures on curved portions of the screen cannot be directly obtained by the user. Especially in a full-screen operation scenario of playing a game or watching a full-screen movie on the curved screen, the user usually cannot view picture information on edges of the screen or is subject to reflection of light on the edges due to the curved structure. In addition, in the full-screen operation scenario, some operations need to be triggered on a curved surface of the screen, leading to inconvenient triggering or proneness to mistaps.

SUMMARY

The present invention provides an electronic device and a method for controlling an electronic device.

According to a first aspect, an embodiment of the present invention provides an electronic device, including:

- a screen, where the screen includes a bendable flexible screen portion;
- a flexible threaded rod, where the flexible threaded rod is disposed on a back side of the flexible screen portion; and
- at least two support blocks, where each of the support blocks is arranged on the back side of the flexible screen portion and is configured to support the flexible screen portion, each support block is sleeved on the flexible threaded rod, at least one support block cooperates with the flexible threaded rod through threads, and the flexible threaded rod and the at least two support blocks are movable between a first state and a second state; where
- in the first state, the flexible screen portion is curved; and
- in the second state, the flexible screen portion is flat.

According to a second aspect, an embodiment of the present invention provides a method for controlling an electronic device, applied to the electronic device provided in the first aspect, and the method includes:

- receiving a screen adjustment instruction; and
- controlling, according to the screen adjustment instruction, a flexible threaded rod and at least two support blocks to move and switch between a first state and a second state.

According to a third aspect, an embodiment of the present invention provides a method for controlling an electronic device, applied to the electronic device provided in the first aspect, and the method includes:

- receiving a screen adjustment operation performed by a user; and
- controlling, in response to the screen adjustment operation, a flexible threaded rod and at least two support blocks to move and switch between a first state and a second state.

According to a fourth aspect, an embodiment of the present invention provides an electronic device, where the electronic device is an electronic device provided in the first aspect, and the electronic device includes:

- a first receiving module, configured to receive a screen adjustment instruction; and
- a first control module, configured to: according to the screen adjustment instruction, control a flexible threaded rod and at least two support blocks to move and switch between a first state and a second state.

According to a fifth aspect, an embodiment of the present invention provides an electronic device, where the electronic device is an electronic device provided in the first aspect, and the electronic device includes:

- a second receiving module, configured to receive a screen adjustment operation performed by a user; and
- a second control module, configured to: in response to the screen adjustment operation, control a flexible threaded rod and at least two support blocks to move and switch between a first state and a second state.

In the embodiments of the present invention, statuses of the flexible threaded rod and the at least two support blocks can be switched based on specific use requirements for the electronic device, to adjust a screen status of the flexible screen portion, so as to meet use requirements of different use environments and users. This avoids the problems caused by a single curved surface structure, such as inconvenient viewing of displayed content, reflection of light on a curved surface, mistaps on functions, and inconvenient triggering.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
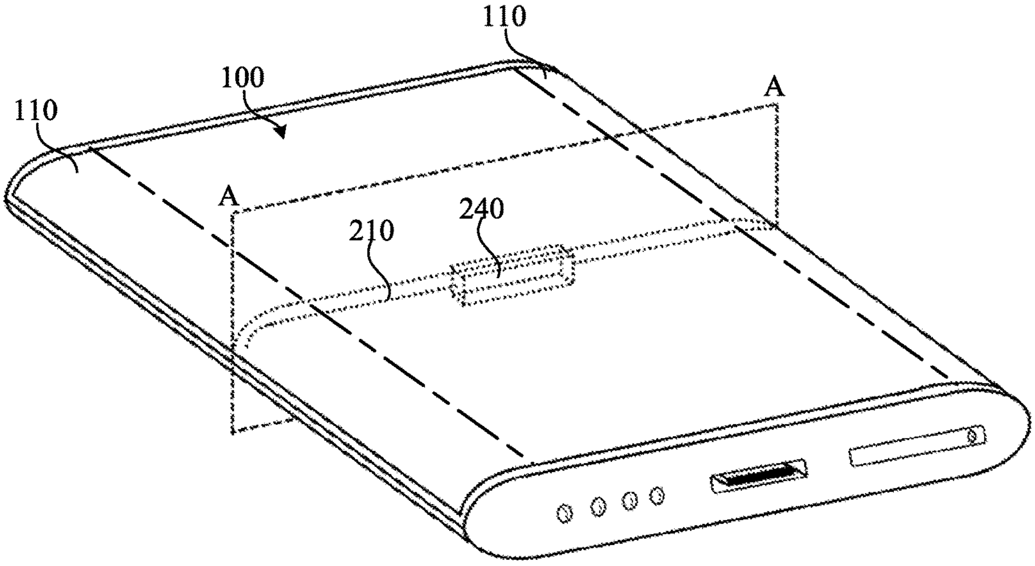
FIG. 1 is a schematic structural diagram of an electronic device with a flexible threaded rod and at least two support blocks being in a first state according to an embodiment of the present invention.

To make the technical problems to be resolved, technical solutions, and advantages of the present invention clearer, the following provides descriptions with reference to accompanying drawings and specific embodiments.

Referring to FIG. 1 to FIG. 5, an embodiment of the present invention provides an electronic device, which may include: a screen 100, a flexible threaded rod 210, and at least two support blocks 220.

The screen 100 includes a bendable flexible screen portion 110. The flexible threaded rod 210 is disposed on a back side of the flexible screen portion 110. Each of the support blocks 220 is arranged on the back side of the flexible screen portion 110 and is configured to support the flexible screen portion 110, each support block 220 is sleeved on the flexible threaded rod 210, at least one support block 220 cooperates with the flexible threaded rod 210 through threads, and the flexible threaded rod 210 and the at least two support blocks 220 are movable between a first state and a second state.

Figure 2:
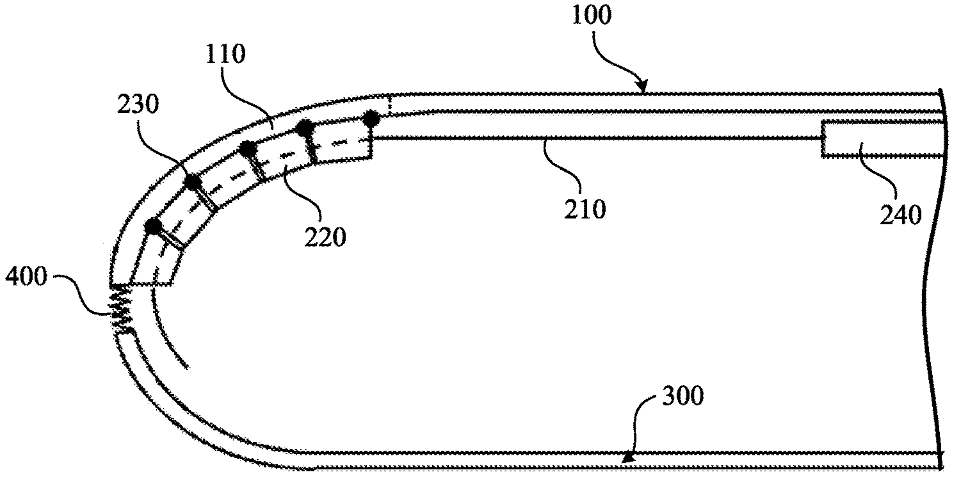
FIG. 2 is a schematic local sectional view of an A-A cross-section of the electronic device shown in FIG. 1.
Figure 3:
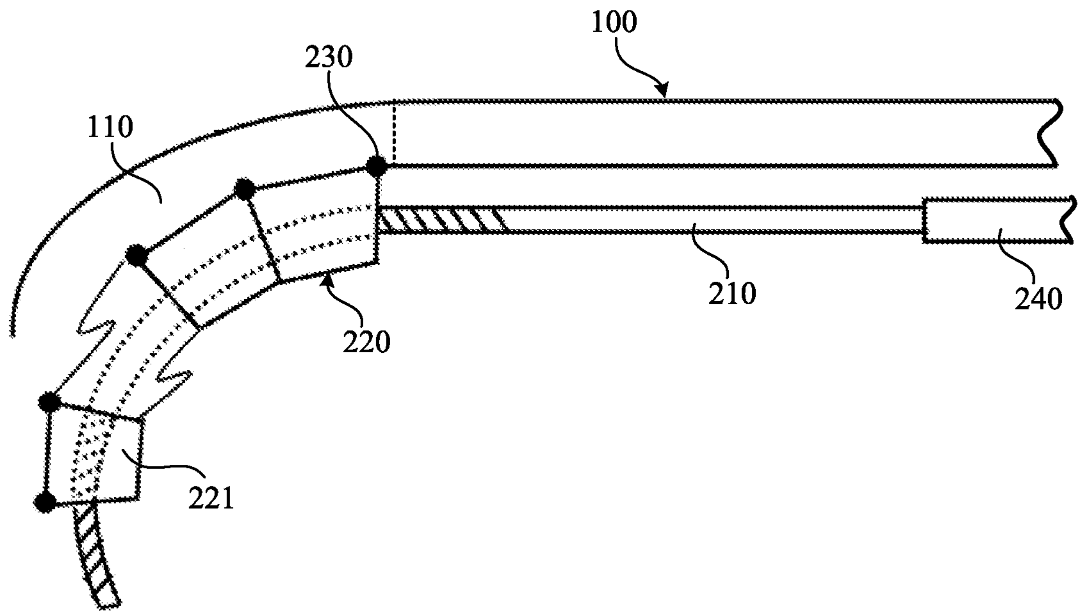
FIG. 3 is a local schematic diagram of a flexible threaded rod and at least two support blocks being in a first state according to an embodiment of the present invention.
Figure 4:
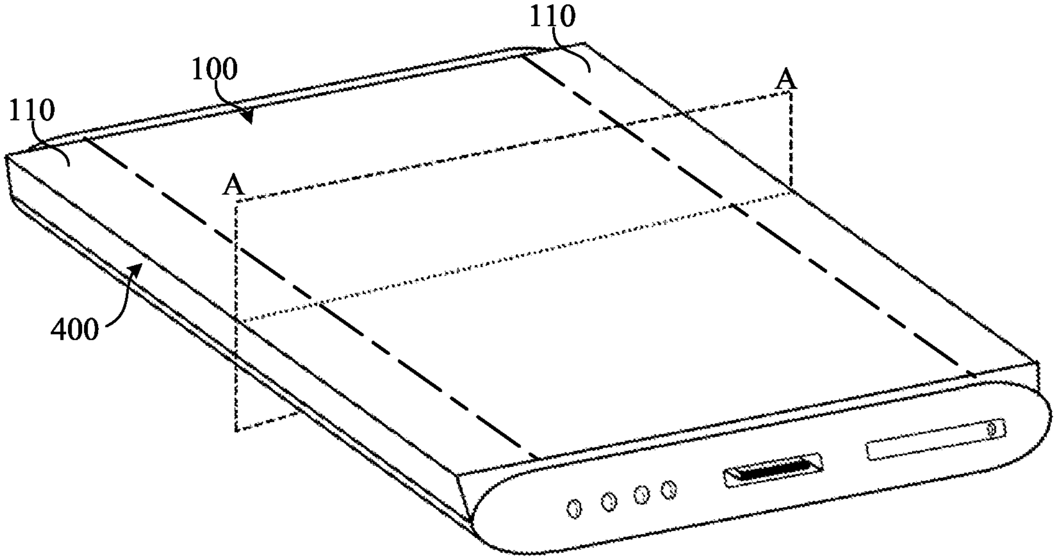
FIG. 4 is a schematic structural diagram of an electronic device with a flexible threaded rod and at least two support blocks being in a second state according to an embodiment of the present invention.
Figure 5:
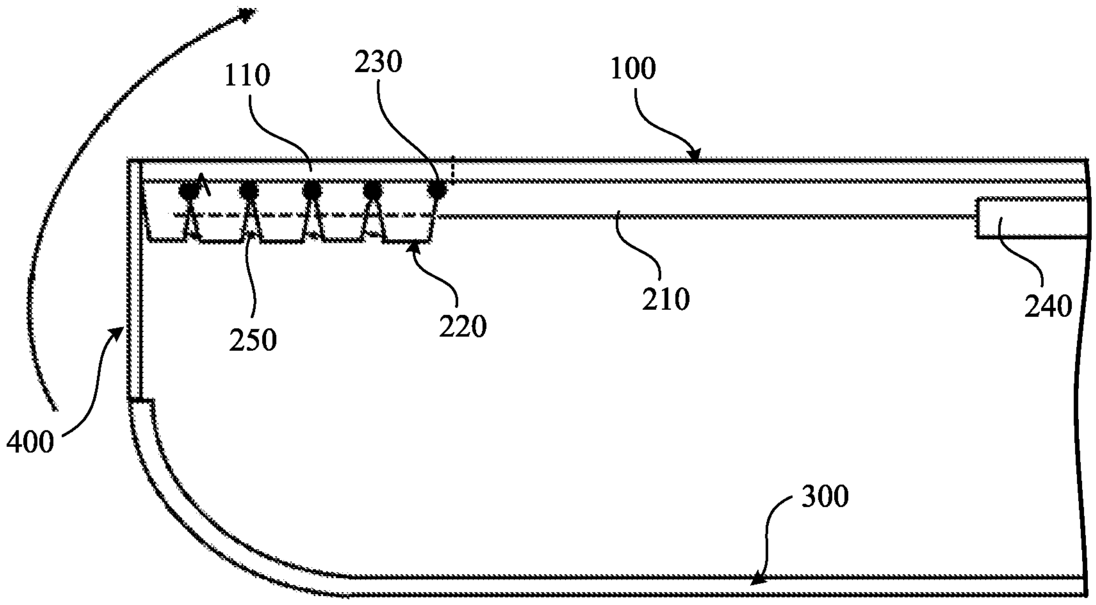
FIG. 5 is a schematic local sectional view of an A-A cross-section of the electronic device shown in FIG. 4.

As shown in FIG. 1 to FIG. 3, the flexible screen portion 110 is curved in the first state. As shown in FIG. 4 and FIG. 5, the flexible screen portion 110 is flat in the second state.

Herein, the at least one support block 220 that cooperates with the flexible threaded rod 210 is all or part of the support blocks in the at least two support blocks 220 configured to support the flexible screen portion 110. The at least two support blocks 220 are disposed on the back side of the flexible screen portion 110. In this embodiment of the present invention, for ease of description, the at least one support block 220 that cooperates with the flexible threaded rod 210 through threads is referred to as a first support block and is denoted by 221 below. In this embodiment of the present invention, the flexible threaded rod 210 is a threaded rod that can be bent and deformed.

In this embodiment of the present invention, the at least two support blocks 220 support the flexible screen portion 110, and under action of threads between the flexible threaded rod 210 and the first support block 221, the flexible threaded rod 210 drives the first support block 221 to cooperate and move, and further drives a support block 220 other than the first support block 221 in the at least two support blocks 220 to move, so that adjacent support blocks 220 get closer to each other in a direction approaching each other or get separated in a direction of being away from each other, and the flexible threaded rod 210 and the at least two support blocks 220 move between the first state and the second state. As a result, the flexible screen portion 110 is adjusted and changed between a curved screen state and a flat screen state, and the flexible screen portion 110 remains curved or flat. To be specific, a screen status of the flexible screen portion 110 can be adjusted through state switching of the flexible threaded rod 210 and the at least two support blocks 220, that is, the flexible screen portion 110 is switched to a curved screen or a flat screen.

It can be understood that if the flexible threaded rod 210 rotates in a first direction, the first support block 221 is driven by the flexible threaded rod 210 to cooperate and move, and adjacent support blocks 220 in the at least two support blocks 220 get closer to each other in the direction of approaching each other; and the flexible threaded rod 210 rotates in a second direction opposite to the first direction, the first support block 221 is driven by the flexible threaded rod 210 to cooperate and move, and adjacent support blocks 220 in the at least two support blocks 220 get separated in the direction of being away from each other. Alternatively, if the flexible threaded rod 210 rotates in the first direction, the first support block 221 is driven by the flexible threaded rod 210 to cooperate and move, and adjacent support blocks 220 in the at least two support blocks 220 get separated in the direction of being away from each other; and the flexible threaded rod 210 rotates in the second direction opposite to the first direction, the first support block 221 is driven by the flexible threaded rod 210 to cooperate and move, and adjacent support blocks 220 in the at least two support blocks 220 get closer to each other in the direction of approaching each other.

In a case that the flexible threaded rod 210 and the at least two support blocks 220 are in the second state, the flexible screen portion 110 may be flush with other portions, to which the flexible screen portion 110 is connected, of the screen (as shown in FIG. 4 and FIG. 5), or is tilted. The flexible threaded rod 210 and the at least two support blocks 220 are in the second state, so that the flexible screen portion 110 is flat, facilitating viewing of displayed content on the portion by the user. In addition, the flexible screen portion 110 being flat facilitates function triggering by the user, avoiding mistaps on functions or inconvenient triggering. In this embodiment of the present invention, a curved surface formed by the flexible screen portion 110 may be of a preset curvature, for example, the preset curvature may be a Gaussian curvature.

It can be understood that, in a case that the flexible screen portion 110 is flat, due to rigidity of the flexible screen portion 110 and a support force provided by the at least two support blocks 220 for the flexible screen portion 110 when the flexible screen portion 110 is unfolded to be flat, the flexible screen portion 110 can support touch operations such as tap and touch, without affecting use of functions on the screen.

In this embodiment of the present invention, the flexible screen portion 110 may be a structure spliced with the screen 100, or may be a portion formed integrally with the screen 100. A side of the flexible screen portion 110 facing outside of the electronic device and used for displaying images is a front side, and a side facing inside of the electronic device is a back side. The front side of the flexible screen portion 110 is opposite the back side of the flexible screen portion 110.

In this embodiment of the present invention, the at least two support blocks 220 are disposed on the back side of the flexible screen portion 110 to support the flexible screen portion 110. Each of the support blocks 220 is sleeved on the flexible threaded rod 210 to cooperate and move. In a case that the flexible threaded rod 210 and the at least two support blocks 220 are in the first state, the flexible screen portion 110 is curved; and in a case that the flexible threaded rod 210 and the at least two support blocks 220 are in the second state, the flexible screen portion 110 is flat. In other words, the statuses of the flexible threaded rod 210 and the at least two support blocks 220 can be switched through rotation according to specific use requirements for the electronic device, to adjust a screen state of the flexible screen portion 110, satisfying use requirements of different use environments and users.

In this embodiment of the present invention, each of the support blocks 220 is sleeved on the flexible threaded rod 210. To avoid a support block 220 other than the first support block 221 in the at least two support blocks 220 from affecting threaded cooperation between the first support block 221 and the threaded rods 210, a through hole may be provided in the support block 220 other than the first support block 221 in the at least two support blocks 220, for the flexible threaded rod 210 to pass through and move within the through hole. For example, as shown in FIG. 3, in this embodiment of the present invention, there may be one first support block 221, and the first support block 221 is a last support block 220 close to the edge of the flexible screen portion 110 in the at least two support blocks 220. In the first state, the flexible threaded rod 210 is exposed out of the first support block 221.

In this embodiment of the present invention, to implement threaded cooperation between the first support block 221 and the flexible threaded rod 210, a threaded hole (as shown in FIG. 3) may be provided in the first support block 221, or a nut structure for cooperating with the flexible threaded rod 210 through threads may be disposed on the first support block 221.

In this embodiment of the present invention, based on different screen design requirements and use requirements, in a case that the flexible threaded rod 210 and the at least two support blocks 220 are in the first state, the curved surface formed by the flexible screen portion 110 may be in different shapes, with its cross-section being in different arc states. For example, in some optional embodiments of the present invention, the flexible screen portion 110 is located at the edge of the screen 100. As shown in FIG. 2 and FIG. 3, in the first state, the cross-section of the flexible screen portion 110 is an arc protruding towards the front side. In this way, the flexible screen portion 110 can provide the user with a good grip feeling in the first state. Certainly, based on design requirements, in a case that the flexible threaded rod 210 and the at least two support blocks 220 are in the first state, the cross-section of the flexible screen portion 110 may alternatively be an arc concave to the back side.

Optionally, in some embodiments of the present invention, referring to FIG. 2, FIG. 3, and FIG. 5, the at least two support blocks 220 are attached to the back side of the flexible screen portion 110, and two adjacent support blocks 220 are rotatably connected and a pivot shaft 230 of the two adjacent support blocks 220 is located on a side close to the flexible screen portion 110. In this way, under action of the threads between the flexible threaded rod 210 and the first support block 221, through the pivot shaft 230 between the two adjacent support blocks 220, the two adjacent support blocks 220 may relatively rotate in the direction of approaching each other, to remain a first included angle between the two adjacent support blocks 220, so that the flexible threaded rod 210 and the at least two support blocks 220 are in the first state; or, the two adjacent support blocks 220 may relatively rotate in the direction of being away from each other, to remain a second included angle between the two adjacent support blocks 220, so that the flexible threaded rod 210 and the at least two support blocks 220 are in the second state, where the first included angle is smaller than the second included angle. Herein, the support block 220 may be in a preset shape, for example, the support block 220 may be in a prismatic shape, a wedge shape, or the like. A width of a cross-section on a side, close to the flexible screen portion 110, of the preset shape in a direction perpendicular to the pivot shaft 230 is greater than a width of a cross-section on a side, far away from the flexible screen portion 110, of the preset shape in the direction perpendicular to the pivot shaft 230, so as to facilitate rotation between the two adjacent support blocks 220.

In this embodiment of the present invention, in order to further improve the support force of the at least two support blocks 220 for the flexible screen portion 110 being unfolded to be flat, an adjusting member for supporting the at least two support blocks 220 may be disposed between the at least two support blocks 220, so as to ensure proper use of the flexible screen portion 110 in a flat screen state. For example, the adjusting member may be at least one of an electromagnetic mechanism, a shape memory material member, and an elastic member.

Alternatively, in some embodiments of the present invention, the adjusting member may be an elastic member 250. Referring to FIG. 5, two adjacent support blocks 220 are connected by using the elastic member 250, and the elastic member 250 is located on the side far away from the flexible screen portion 110. In the first state, the elastic member 250 may be in a compressed state. In the second state, the elastic member 250 is released from compression to provide support for the two adjacent support blocks 220 and increase a rotational force of the two adjacent support blocks 220 in the direction being away from each other; and in the second state, the support force of the support block 220 for the flexible screen portion 110 is increased. Certainly, according to actual design requirements, in the second state, the elastic member 250 may alternatively be in a stretched state; and in the first state, the elastic member is released from the stretched state and is in an initial state.

Optionally, in some embodiments of the present invention, referring to FIG. 1, FIG. 2, FIG. 3, and FIG. 5, the electronic device may further include a driving member 240. The driving member 240 is connected to the flexible threaded rod 210, and the driving member 240 is configured to drive the flexible threaded rod 210 to rotate. Herein, the flexible threaded rod 210 is powered by the driving member 240, and the driving member 240 drives the flexible threaded rod 210 to rotate, so that the at least two support blocks 220 cooperate with the flexible threaded rod 210 to move, implementing motion of the flexible threaded rod 210 and the at least two support blocks 220 between the first state and the second state. For example, in this embodiment of the present invention, the driving member 240 may be a micro driving motor.

Optionally, in some embodiments of the present invention, referring to FIG. 2 and FIG. 5, the flexible screen portion 110 is connected to a back connector 300, where the back connector 300 may be a cover plate or a back screen. Herein, the back connector 300 may be disposed facing away from the screen 100, to provide support and placement support during using of the electronic device by the user and to provide protection for internal components of the electronic device. It can be understood that, if the back connector

300 is a back screen, the back screen may have a structure the same as or different from the screen 100.

Optionally, in some embodiments of the present invention, referring to FIG. 2, FIG. 4, and FIG. 5, the electronic device may further include a folding member 400, where the folding member 400 is connected between the flexible screen portion 110 and the back connector 300. In the first state, the folding member 400 is folded inward, so that the flexible screen portion 110 is curved, providing a good grip feeling and better aesthetic experience for the user. In the second state, the folding member 400 is unfolded, so that the flexible screen portion 110 is flat, providing structural support for the flexible screen portion 110 via structural rigidity of the folding member 400. For example, in a case that the flexible threaded rod 210 and the at least two support blocks 220 switch from the first state to the second state, the folding member 400 is unfolded from a state shown in FIG. 2 along the arrow direction shown in FIG. 5.

Alternatively, in some embodiments of the present invention, in order to ensure structural integration of the electronic device and provide dustproof protection for the internal components of the electronic device, the folding member 400 may include at least two folding sheets. The at least two folding sheets may include a first folding sheet and a second folding sheet. To be specific, as shown in FIG. 2, the folding member 400 may include a first folding sheet and a second folding sheet. One end of the first folding sheet is flexibly connected to an edge of the flexible screen portion 110, one end of the second folding sheet is rotatably connected to the other end of the first folding sheet, and the other end of the second folding sheet is flexibly connected to an edge of the back connector 300. Herein, the one end of the first folding sheet being flexibly connected to an edge of the flexible screen portion 110 means that one end of the first folding sheet is connected to at least one of the edges of the flexible screen portion 110 in a deformable manner, facilitating integrated combination of one end of the first folding sheet and the edge of the flexible screen portion 110, and improving the grip feeling and aesthetic experience of the user. Similarly, the one end of the second folding sheet being flexibly connected to an edge of the back connector 300 means that one end of the second folding sheet is connected to at least one of the edges of the back connector 300 in a deformable manner, facilitating integrated combination of one end of the second folding sheet and the edge of the back connector 300 and improving the grip feeling and aesthetic experience of the user.

In addition, in some optional embodiments of the present invention, the electronic device may further include a touch-control key, where the touch-control key is disposed on the folding member 400. A portion of the touch-control key may be embedded in the folding member 400 or protrude out of the folding member. In this way, in the first state, the folding member 400 is folded inward, and the touch-control key is hidden; and in the second state, the folding member 400 is unfolded, and the touch-control key is in a touchable state or exposed outside the electronic device, providing a key-based operation manner for the user when the flexible screen portion 110 is in the flat screen state. Herein, the touch-control key may be disposed in various forms. For example, the touch-control key may be a physical key such as a mechanical key or an electronic key. For another example, the touch-control key may be a touch key, such as a resistive touch key or a capacitive touch key.

In addition, in this embodiment of the present invention, there may be a plurality of flexible screen portions 110, each of the flexible screen portions 110 is located at an edge of the screen, and a flexible threaded rod 210 and at least two support blocks 220 are disposed on a back of each of the flexible screen portions 110. For example, as shown in FIG. 1 and FIG. 4, there may be two flexible screen portions 110, respectively located at two opposite edges of the screen 100. Different flexible threaded rods 210 may be provided for different flexible screen portions 110, and different driving members 240 may be used to drive corresponding flexible threaded rods 210, or the same driving members 240 may be used to drive the different flexible threaded rods 210. For another example, there may be four flexible screen portions 110, located at four edges of the screen 100, respectively.

In addition, in this embodiment of the present invention, the electronic device may be a mobile phone or a tablet computer. It can be understood that the electronic device is not limited to a mobile phone and a tablet computer, and may also be an electronic device with a screen display function, such as a laptop computer or a personal digital assistant (PDA).

According to the electronic device provided in this embodiment of the present invention, statuses of the flexible threaded rod and the at least two support blocks can be switched based on specific use requirements for the electronic device to adjust a screen status of the flexible screen portion, so as to meet use requirements of different use environments and users. This avoids the problems caused by a single curved surface structure, such as inconvenient viewing of displayed content, reflection of light on a curved surface, mistaps on functions, and inconvenient triggering.

Figure 6:
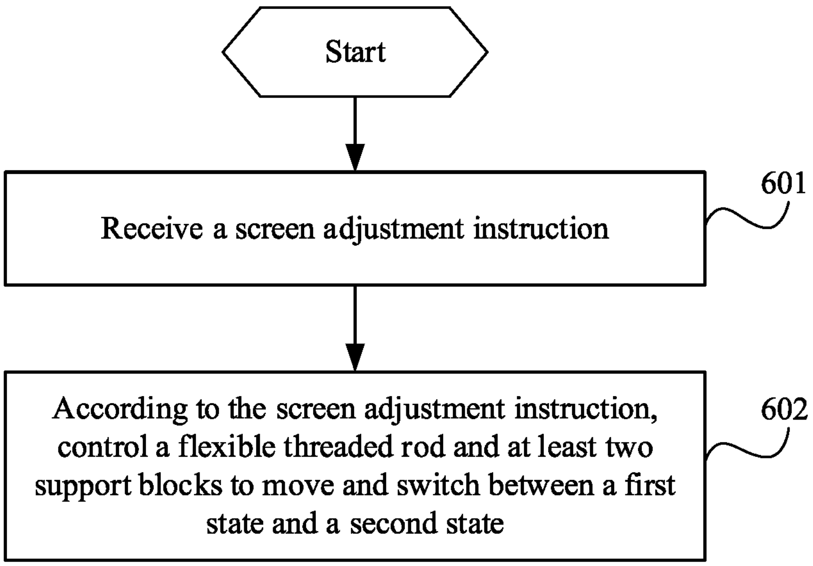
FIG. 6 is a first schematic flowchart of a method for controlling an electronic device according to an embodiment of the present invention.

Referring to FIG. 6, FIG. 6 is a first schematic flowchart of a method for controlling an electronic device according to an embodiment of the present invention. This embodiment of the present invention provides a method for controlling an electronic device, applied to the foregoing electronic device. The method may include the following steps.

Step 601: Receive a screen adjustment instruction.

Step 602: According to the screen adjustment instruction, control a flexible threaded rod and at least two support blocks to move and switch between a first state and a second state.

In this embodiment of the present invention, the electronic device monitors and receives a screen adjustment instruction for adjusting the screen, and in a case that the screen adjustment instruction is received, statuses of the flexible threaded rod and the at least two support blocks are controlled to switch according to the screen adjustment instruction, that is, being switched from the first state to the second state or switched from the second state to the first state, so as to adjust a screen state of the flexible screen portion of the screen. In this way, the flexible screen portion is adjusted from a curved screen state to a flat screen state, or is adjusted from a flat screen state to a curved screen state. In this way, the screen state of the flexible screen portion can be adjusted based on a specific usage scenario of the electronic device, so as to meet use requirements of different usage scenarios and avoid the problems caused by a single curved surface structure, such as inconvenient viewing of displayed content, reflection of light on a curved surface, mistaps on functions, and inconvenient triggering.

Optionally, in some embodiments of the present invention, the controlling, according to the screen adjustment instruction, a flexible threaded rod and at least two support blocks to move and switch between a first state and a second state in step 602 may include the following steps: comparing the screen adjustment instruction with a preset adjustment instruction; in a case that the screen adjustment instruction matches a first preset adjustment instruction, controlling the flexible threaded rod and the at least two support blocks to switch from the first state to the second state; and in a case that the screen adjustment instruction matches a second preset adjustment instruction, controlling the flexible threaded rod and the at least two support blocks to switch from the second state to the first state; where the first preset adjustment instruction is used to switch the flexible threaded rod and the at least two support blocks from the first state to the second state, and the second preset adjustment instruction is used to switch the flexible threaded rod and the at least two support blocks from the second state to the first state. In this embodiment of the present invention, a preset adjustment instruction for controlling to switch the flexible threaded rod and the at least two support blocks is set in advance. The preset adjustment instruction includes a first preset adjustment instruction and a second preset adjustment instruction. Herein, after receiving the screen adjustment instruction, the electronic device performs comparing and matching on the screen adjustment instruction and the preset adjustment instruction, so as to determine switching that is of the flexible threaded rod and the at least two support blocks and corresponding to the screen adjustment instruction, thereby implementing accurate control.

Optionally, in this embodiment of the present invention, whether to receive a screen adjustment instruction may be determined based on a use status of the screen. For example, in a case that it is detected that a display mode of the screen is full-screen display or the screen currently displays a preset gaming scenario, it is determined that the screen adjustment instruction has been received and the screen adjustment instruction matches the first preset adjustment instruction. In a case that it is detected that the display mode of the screen exits from full-screen display or the screen exits from the preset gaming scenario, it is determined that the screen adjustment instruction has been received and the screen adjustment instruction matches the second preset adjustment instruction. Certainly, in this embodiment of the present invention, a corresponding screen adjustment instruction may alternatively be received based on a user input operation. For example, in a case that a first input on the flexible screen portion by the user is received, the electronic device may determine that the screen adjustment instruction is received and the screen adjustment instruction matches the first preset adjustment instruction. In a case that a second input on the flexible screen portion by the user is received, the electronic device may determine that the screen adjustment instruction is received and the screen adjustment instruction matches the second preset adjustment instruction.

Optionally, in some embodiments of the present invention, in order to improve the human-device interaction experience, the method may further include the following step: issuing a preset prompt according to the screen adjustment instruction. Herein, the preset prompt may include at least one of prompt manners such as a vibration prompt, a preset sound prompt, and a preset light prompt. In this embodiment of the present invention, after receiving the screen adjustment instruction, the electronic device may issue the preset prompt according to the screen adjustment instruction on at least one of such occasions as before, after, or during state switching of the flexible threaded rod and the at least two support blocks.

For example, the preset prompt may include a first dynamic prompt and a second dynamic prompt, and the electronic device issues the first dynamic prompt in a process of controlling the flexible threaded rod and the at least two support blocks to switch from the first state to the second state; and issues the second dynamic prompt in a process of controlling the flexible threaded rod and the at least two support blocks to switch from the second state to the first state, where the first dynamic prompt and the second dynamic prompt may be different or the same.

According to the method for controlling an electronic device provided in this embodiment of the present invention, the screen adjustment instruction is received, and according to the screen adjustment instruction, the flexible threaded rod and the at least two support blocks are controlled to switch between the first state and the second state. In this way, the screen state of the flexible screen portion can be adjusted based on a specific usage scenario of the electronic device, so as to meet use requirements of different usage scenarios and avoid the problems caused by a single curved surface structure, such as inconvenient viewing of displayed content, reflection of light on a curved surface, mistaps on functions, and inconvenient triggering.

Figure 7:
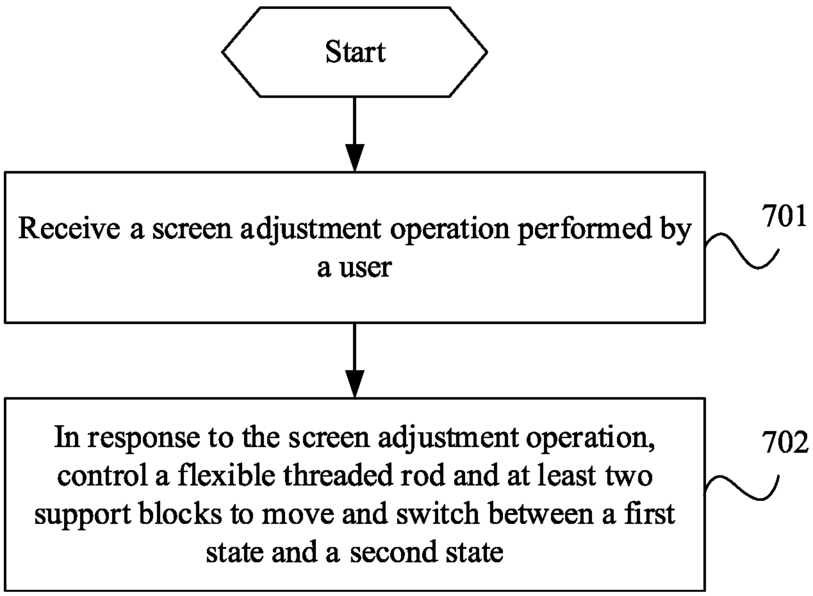
FIG. 7 is a second schematic flowchart of a method for controlling an electronic device according to an embodiment of the present invention.

Referring to FIG. 7, FIG. 7 is a second schematic flowchart of a method for controlling an electronic device according to an embodiment of the present invention. This embodiment of the present invention provides a method for controlling an electronic device, applied to the foregoing electronic device. The method may include the following steps.

Step 701: Receive a screen adjustment operation performed by a user.

Step 702: In response to the screen adjustment operation, control a flexible threaded rod and at least two support blocks to move and switch between a first state and a second state.

Herein, the screen adjustment operation may be at least one of a preset voice input operation, a touch input operation acting on the electronic device, a gesture motion input operation, and a motion input operation acting on the electronic device. Herein, the touch input operation acting on the electronic device may include but is not limited to a touch input operation acting on the screen or a housing; the gesture motion input operation may include but is not limited to a finger gesture motion input operation, a head motion input operation, a facial motion input operation, and the like; and the motion input operation acting on the electronic device may include but is not limited to a swing motion input operation and a flip motion input operation that are acting on the electronic device, and the like.

In this embodiment of the present invention, when the user needs to adjust the flexible screen portion of the screen, a screen adjustment operation can be performed, so that the electronic device receives the screen adjustment operation, and in response to the screen adjustment operation, controls the flexible threaded rod and the at least two support blocks to switch, that is, to switch from the first state to the second state or switch from the second state to the first state, so as to adjust a screen state of the flexible screen portion of the screen. In this way, the flexible screen portion is adjusted from a curved screen state to a flat screen state, or is adjusted from a flat screen state to a curved screen state. In this way, the screen state of the flexible screen portion can be adjusted based on a screen use requirement of the user, so as to meet different use requirements of different users and also avoid the problems caused by a single curved surface structure, such as inconvenient viewing of displayed content, reflection of light on a curved surface, mistaps on functions, and inconvenient triggering.

In this embodiment of the present invention, the screen adjustment operation for controlling the flexible threaded rod and the at least two support blocks to switch from the first state to the second state, and the screen adjustment operation for controlling the flexible threaded rod and the at least two support blocks to switch from the second state to the second state may use different operation inputs to improve personalization of operations, or use the same operation inputs to simplify user operations.

For example, in some optional embodiments of the present invention, the controlling, in response to the screen adjustment operation, a flexible threaded rod and at least two support blocks to move and switch between a first state and a second state in step 702 may include the following steps: in a case that the flexible screen portion is curved, controlling, in response to the screen adjustment operation, the flexible threaded rod and the at least two support blocks to switch from the first state to the second state; and in a case that the flexible screen portion is flat, controlling, in response to the screen adjustment operation, the flexible threaded rod and the at least two support blocks to switch from the second state to the first state.

Optionally, in some embodiments of the present invention, in order to improve the human-device interaction experience, the method may further include the following step: issuing a preset prompt according to the screen adjustment operation. This helps enhance personalization and fun of use and improve user experience. Herein, the preset prompt may include at least one of prompt manners such as a vibration prompt, a preset sound prompt, and a preset light prompt. In this embodiment of the present invention, after receiving the screen adjustment operation, the electronic device may issue the preset prompt in response to the screen adjustment operation on at least one of such occasions as before, after, or during state switching of the flexible threaded rod and the at least two support blocks. For example, the preset prompt may include a first dynamic prompt and a second dynamic prompt, and the electronic device issues the first dynamic prompt in a process of controlling the flexible threaded rod and the at least two support blocks to switch from the first state to the second state; and issues the second dynamic prompt in a process of controlling the flexible threaded rod and the at least two support blocks to switch from the second state to the first state, where the first dynamic prompt and the second dynamic prompt may be different or the same.

According to the method for controlling an electronic device provided in this embodiment of the present invention, the screen adjustment operation is received, and in response to the screen adjustment operation, the flexible threaded rod and the at least two support blocks are controlled to switch between the first state and the second state. In this way, the screen state of the flexible screen portion can be adjusted based on a screen use requirement of the user, so as to meet different use requirements of different users and also avoid the problems caused by a single curved surface structure, such as inconvenient viewing of displayed content, reflection of light on a curved surface, mistaps on functions, and inconvenient triggering.

Based on the foregoing method applied to an electronic device, an embodiment of the present invention provides an electronic device for implementing the foregoing method.

Figure 8:
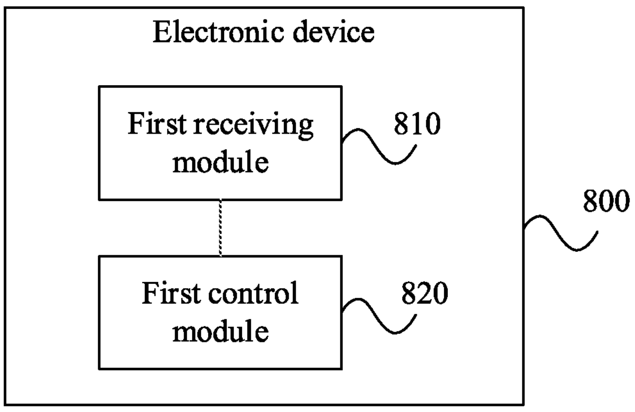
FIG. 8 is a first block diagram of an electronic device according to an embodiment of the present invention.

Referring to FIG. 8, FIG. 8 is a first structural block diagram of an electronic device according to an embodiment of the present invention. This embodiment of the present invention provides an electronic device 800. The electronic device 800 is the foregoing electronic device, and the electronic device 800 may include a first receiving module 810 and a first control module 820.

The first receiving module 810 is configured to receive a screen adjustment instruction.

The first control module 820 is configured to: according to the screen adjustment instruction, control a flexible threaded rod and at least two support blocks to move and switch between a first state and a second state.

Optionally, in some embodiments of the present invention, the first control module 820 may include a comparison unit, a first control unit, and a second control unit.

The comparison unit is configured to compare the screen adjustment instruction with a preset adjustment instruction.

The first control unit is configured to: in a case that the screen adjustment instruction matches a first preset adjustment instruction, control the flexible threaded rod and the at least two support blocks to switch from the first state to the second state.

The second control unit is configured to: in a case that the screen adjustment instruction matches a second preset adjustment instruction, control the flexible threaded rod and the at least two support blocks to switch from the second state to the first state.

The first preset adjustment instruction is used to switch the flexible threaded rod and the at least two support blocks from the first state to the second state, and the second preset adjustment instruction is used to switch the flexible threaded rod and the at least two support blocks from the second state to the first state.

Optionally, in some embodiments of the present invention, the electronic device 800 may further include a first prompt module.

The first prompt module is configured to issue a preset prompt according to the screen adjustment instruction. The preset prompt may include at least one of prompt manners such as a vibration prompt, a preset sound prompt, and a preset light prompt.

The electronic device provided in this embodiment of the present invention is capable of implementing processes that are implemented by the electronic device in the method embodiment applied to the electronic device in FIG. 6. To avoid repetition, details are not described herein again.

The electronic device provided in this embodiment of the present invention receives the screen adjustment instruction by using the first receiving module, and according to the screen adjustment instruction, controls, by using the first control module, the flexible threaded rod and the at least two support blocks to switch between the first state and the second state. In this way, the screen state of the flexible screen portion can be adjusted based on a specific usage scenario of the electronic device, so as to meet use requirements of different usage scenarios and avoid the problems caused by a single curved surface structure, such as inconvenient viewing of displayed content, reflection of light on a curved surface, mistaps on functions, and inconvenient triggering.

Figure 9:
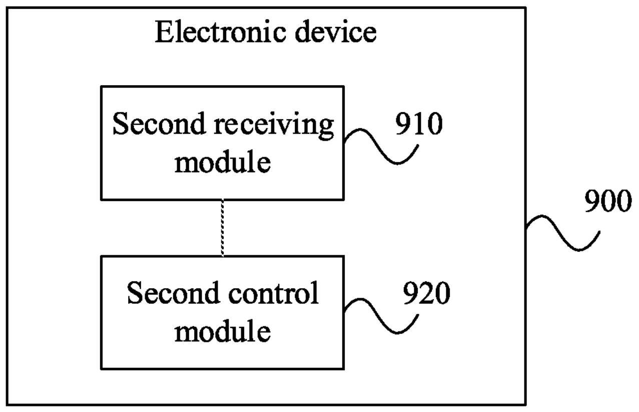
FIG. 9 is a second block diagram of an electronic device according to an embodiment of the present invention.

Referring to FIG. 9, FIG. 9 is a second structural block diagram of an electronic device according to an embodiment of the present invention. This embodiment of the present invention provides an electronic device 900. The electronic device 900 is the foregoing electronic device, and the electronic device may include a second receiving module 910 and a second control module 920.

The second receiving module 910 is configured to receive a screen adjustment operation performed by a user.

The second control module 920 is configured to: in response to the screen adjustment operation, control a flexible threaded rod and at least two support blocks to move and switch between a first state and a second state.

Optionally, in some embodiments of the present invention, the second control module 920 may include a fourth control unit and a fifth control unit.

The fourth control unit is configured to: in a case that the flexible screen portion is curved, control, in response to the screen adjustment operation, the flexible threaded rod and the at least two support blocks to switch from the first state to the second state.

The fifth control unit is configured to: in a case that the flexible screen portion is flat, control, in response to the screen adjustment operation, the flexible threaded rod and the at least two support blocks to switch from the second state to the first state.

Optionally, in some embodiments of the present invention, the electronic device 900 may further include a second prompt module.

The second prompt module is configured to issue a preset prompt according to the screen adjustment operation. A preset dynamic prompt may include at least one of prompt manners such as a vibration prompt, a preset sound prompt, and a preset light prompt.

The electronic device provided in this embodiment of the present invention is capable of implementing processes that are implemented by the electronic device in the method embodiment applied to the electronic device in FIG. 7. To avoid repetition, details are not described herein again.

The electronic device provided in this embodiment of the present invention receives the screen adjustment operation by using the second receiving module, and in response to the screen adjustment operation, controls the flexible threaded rod and the at least two support blocks by using the second control module to switch between the first state and the second state. In this way, the screen state of the flexible screen portion can be adjusted based on a screen use requirement of the user, so as to meet different use requirements of different users and also avoid the problems caused by a single curved surface structure, such as inconvenient viewing of displayed content, reflection of light on a curved surface, mistaps on functions, and inconvenient triggering.

It should be understood that, in the description of the specification, the reference terms “an embodiment”, “one embodiment”, or “some embodiments” mean that a particular feature, structure, or characteristic associated with the embodiments is included in at least one embodiment or example of the present invention. Therefore, “in an embodiment,” “in one embodiment,” or “in some embodiments” in various parts throughout this specification does not necessarily indicate the same embodiment. Furthermore, an element, a structure, or a feature described in one figure or embodiment of the present invention may be combined in any suitable manner with an element, a structure, or a feature described in one or more other figures or embodiments.

It should be noted that the terms “include”, “comprise”, or any of their variants in one or more embodiments in this specification are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by “includes a . . . ” does not preclude existence of other identical elements in the process, method, article, or apparatus that includes the element.

In the present invention, unless otherwise specified and defined explicitly, the terms “install”, “link”, “connect”, “fasten”, and “dispose” should be understood in their general senses. For example, the terms may mean a fixed connection, a detachable connection, or an integrated connection; may mean a mechanical connection or an electrical connection; or may mean a direct connection, or an indirect connection through an intermediate medium; or may mean an internal connection between two components or an interaction relationship between two components. A person of ordinary skill in the art may understand specific meanings of the foregoing terms in the present invention according to specific circumstances.

In addition, reference numerals and/or letters may be repeated in different embodiments or examples of the present invention. Such repetition is for the purpose of simplicity and clarity, and does not indicate a relationship between the embodiments and/or arrangements that are discussed.

Furthermore, in the embodiments of the present invention, relational terms such as first and second are used only to differentiate an entity or operation from another entity or operation, and do not necessarily require or imply that any actual relationship or sequence exists between these entities or operations.

Some embodiments of the present invention have been described with reference to the attached drawings; however, the present invention is not limited to the aforesaid embodiments, and these embodiments are merely illustrative but are not intended to limit the present invention. A person of ordinary skill in the art may further derive many other implementations according to the teachings of the present invention and within the scope defined in the claims, and all of the implementations shall fall within the scope of the present invention.

What is claimed is:

1. An electronic device, comprising:

a screen, wherein the screen comprises a bendable flexible screen portion;

a flexible threaded rod, wherein the flexible threaded rod is disposed on a back side of the flexible screen portion; and at least two support blocks, wherein each of the support blocks is arranged on the back side of the flexible screen portion and is configured to support the flexible screen portion, each support block is sleeved on the flexible threaded rod, at least one support block cooperates with the flexible threaded rod through threads, and the flexible threaded rod and the at least two support blocks are movable between a first state and a second state; wherein in the first state, the flexible screen portion is curved; and in the second state, the flexible screen portion is flat, wherein the flexible screen portion is connected to a back connector, and the back connector is a cover plate or a back screen, and the electronic device further comprises:

a folding member, wherein the folding member is connected between the flexible screen portion and the back connector;

in the first state, the folding member is folded inward, so that the flexible screen portion is curved; and in the second state, the folding member is unfolded, so that the flexible screen portion is flat.

2. The electronic device according to claim 1, wherein the flexible screen portion is located at an edge of the screen, and in the first state, a cross-section of the flexible screen portion is an arc protruding towards the front.

3. The electronic device according to claim 1, wherein the at least two support blocks are attached to the back side of the flexible screen portion, two adjacent support blocks are rotatably connected, and a pivot shaft of the two adjacent support blocks is located on a side close to the flexible screen portion.

4. The electronic device according to claim 3, wherein the two adjacent support blocks are connected by an elastic member, and the elastic member is located on a side far away from the flexible screen portion.

5. The electronic device according to claim 1, further comprising:

a driving member, wherein the driving member is connected to the flexible threaded rod, and the driving member is configured to drive the flexible threaded rod to rotate.

6. The electronic device according to claim 1, wherein there are a plurality of the flexible screen portions, each of the flexible screen portions is located at an edge of the screen, and the flexible threaded rod and the at least two support blocks are disposed on a back of each of the flexible screen portions.

7. A method for controlling an electronic device, applied to the electronic device according to claim 1 and comprising:

receiving a screen adjustment instruction; and according to the screen adjustment instruction, controlling a flexible threaded rod and at least two support blocks to move and switch between a first state and a second state.

8. The method according to claim 7, wherein the controlling, according to the screen adjustment instruction, a flexible threaded rod and at least two support blocks to move and switch between a first state and a second state comprises:

comparing the screen adjustment instruction with a preset adjustment instruction;

in a case that the screen adjustment instruction matches a first preset adjustment instruction, controlling the flexible threaded rod and the at least two support blocks to switch from the first state to the second state; and in a case that the screen adjustment instruction matches a second preset adjustment instruction, controlling the flexible threaded rod and the at least two support blocks to switch from the second state to the first state; wherein the first preset adjustment instruction is used to switch the flexible threaded rod and the at least two support blocks from the first state to the second state, and the second preset adjustment instruction is used to switch the flexible threaded rod and the at least two support blocks from the second state to the first state.

9. The method according to claim 7, further comprising:

issuing a preset prompt according to the screen adjustment instruction.

10. An electronic device, wherein the electronic device is the electronic device according to claim 1, and comprises:

a first receiving module, configured to receive a screen adjustment instruction; and a first control module, configured to: according to the screen adjustment instruction, control a flexible threaded rod and at least two support blocks to move and switch between a first state and a second state.

11. The electronic device according to claim 10, wherein the first control module comprises:

a comparison unit, configured to compare the screen adjustment instruction with a preset adjustment instruction;

a first control unit, configured to: in a case that the screen adjustment instruction matches a first preset adjustment instruction, control the flexible threaded rod and the at least two support blocks to switch from the first state to the second state; and a second control unit, configured to: in a case that the screen adjustment instruction matches a second preset adjustment instruction, control the flexible threaded rod and the at least two support blocks to switch from the second state to the first state; wherein the first preset adjustment instruction is used to switch the flexible threaded rod and the at least two support blocks from the first state to the second state, and the second preset adjustment instruction is used to switch the flexible threaded rod and the at least two support blocks from the second state to the first state.

12. The electronic device according to claim 10, further comprising:

a first prompt module, configured to issue a preset prompt according to the screen adjustment instruction.

* * * * *